Dec. 11, 1962

C. F. HINES 3,067,538

FISHHOOK LEADER STAY

Filed June 8, 1961

INVENTOR
CHARLES FREDERICK HINES

BY

ATTORNEY

3,067,538
FISHHOOK LEADER STAY
Charles Frederick Hines, R.F.D. 6, Box 70,
Henrico County, Va.
Filed June 8, 1961, Ser. No. 115,700
2 Claims. (Cl. 43—42.74)

This invention relates to a new and useful improvement in a fishhook leader stay, and particularly such as utilizes a line.

One of the objects of this invention is the provision of a device adapted for securement to a fishing line and to which a plurality of fishhook leaders may be fastened.

Another object of the present invention is the provision of a device for securing leaders quickly and easily.

A further object of this invention is the provision of a device to and from which fishhook leaders may be secured and removed quickly and easily, and without any damage to said leaders.

Other objects and features will more fully appear from the following description and accompanying drawings, in which.

Figure 2:
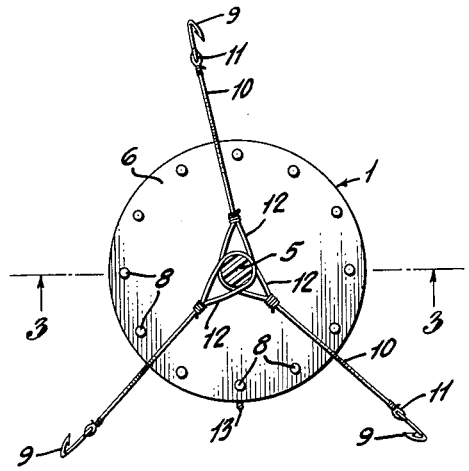
FIG. 2 is a sectional view taken on line 2—2 of FIG. 1.
Figure 1:
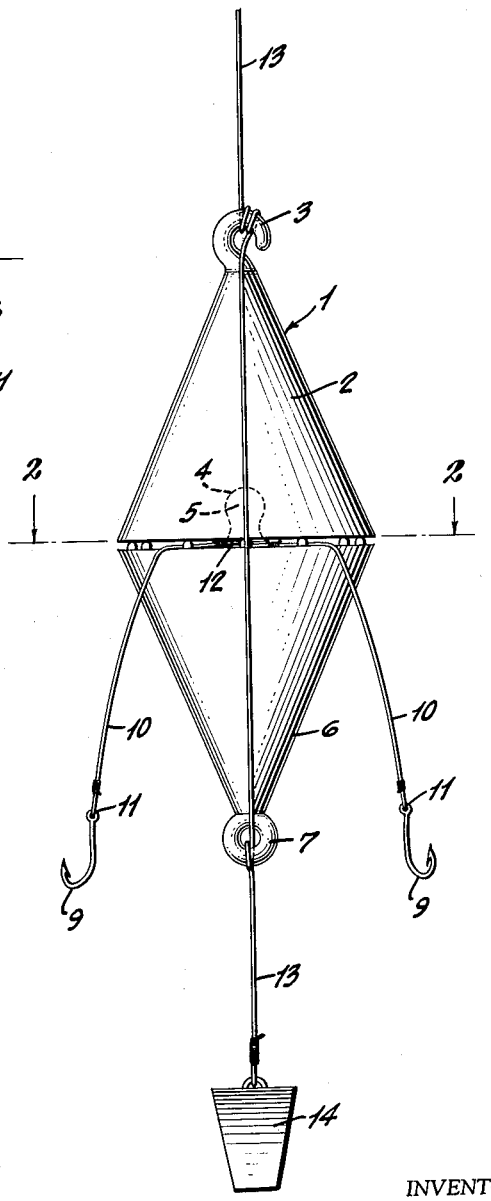
FIG. 1 is a side elevational view of the device.
Figure 3:
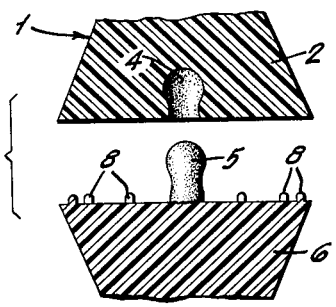
FIG. 3 is a vertical sectional view taken approximately on line 3—3 of FIG. 2.

Referring more particularly to the drawings the body of the device is designated by the numeral 1 and in its preferred form tapers towards each end. The device consists of a conically shaped top 2 having a hook 3 at its apex and a recess 4 centrally disposed in its basal portion. A head 5 is secured to the basal portion of a conically shaped bottom 6 having an eyelet 7 at its tip, and is provided with lugs 8 on the basal portion of said bottom; said lugs being disposed in spaced relation to each other and adapted to engage the basal portion of said top 2 to form limited recesses and also to space said top from the bottom when the latter two are mated, as clearly illustrated in FIG. 1.

Fishhooks 9 respectively have their eyelets connected to one end of leaders 10 that have their other ends provided with loops 12. A fishing line 13 has a sinker 14 on one of its ends and is secured to the device by threading, in loop fashion, the line through eyelet 7 and looping it over hook 3 as clearly illustrated in FIG. 1.

The device is assembled as follows: the leader loops are anchored to the head and the latter is then forced or "snapped" into recess 4 thus securing the top and bottom together. The device is then secured to the line as previously explained, and is so held against vertical displacement.

It is to be noted that the leaders with their attached fishhooks are limited in lateral displacement by lugs 8 and this tends to keep the tangling of the leaders and hooks.

Figure 4:
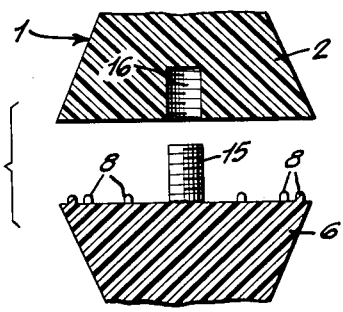
FIG. 4 is a sectional view similar to FIG. 3 except that it shows a modified form of securing the device together.

In FIG. 4 a modification provides a threaded head 15 adapted to be secured in a threaded recess 16. However, the snap on type is preferred as the top and bottom are more quickly separated by the "snap on and off" method.

It is thought obvious that a plurality of fishhooks may be used on the device, and in fact as many devices may be used on a line as may be suitable.

It is also thought apparent that the leaders may be removed quickly, and do not have to be cut from a line, as is often the case when they are tied to a line.

Of course when the leaders are desired to be removed, all that is required is to unwind the line from hook 3 and "snap" off the top, and lift them from head 5.

The device is preferably made of a transparent plastic material although it may be made of any other suitable product.

Having described this invention, what is claimed is:

1. In a device for attachment to a fishing line; a double ended body tapering towards each of its ends; means respectively on each of said ends for securing said body to said line in a detachable fashion; said body consisting of top and bottom members; a head secured in vertical fashion to the central portion of a base on said bottom and adapted to register with a recess in said top so that the latter may be secured to said bottom in detachable fashion; lugs disposed in relatively spaced circumferential fashion on the base of said bottom for maintaining said top and bottom in spaced relation to each other and adapted to form recesses, whereby fishhook leaders may be anchored to said head and respectively extend from said recesses.

2. In a device for attachment to a fishing line; a double ended body having a top and a bottom; said top and bottom respectively tapering towards each of its ends; means on each of said ends for securing said line to said device; said bottom having a base provided with a plurality of lugs adapted to maintain said top in spaced relation to said bottom and thereby form recesses; a head secured to said base and adapted to register with a recess in said top so as to secure said top and bottom together in detachable fashion, said head adapted to anchor a plurality of leaders that extend through said recesses.

References Cited in the file of this patent

UNITED STATES PATENTS

| | | |
|---|---|---|
| 1,352,979 | Lawrence | Sept. 14, 1920 |
| 1,477,864 | Bolton | Dec. 18, 1923 |
| 1,829,857 | Fischer | Nov. 3, 1931 |
| 2,397,030 | Mercier | Mar. 19, 1946 |
| 2,625,767 | Pokras | Jan. 20, 1953 |
| 2,780,023 | Mercier | Feb. 5, 1957 |
| 2,787,079 | Wilson | Apr. 2, 1957 |
| 2,988,314 | Urich | June 13, 1961 |